United States Patent [19]

Kohno

[11] Patent Number: 4,603,917
[45] Date of Patent: Aug. 5, 1986

[54] HYDRAULIC PRESSURE CONTROL VALVE FOR DUAL BRAKE CIRCUIT

[75] Inventor: Teruhisa Kohno, Hyogo, Japan
[73] Assignee: Sumitomo Electric Industries, Ltd., Osaka, Japan
[21] Appl. No.: 624,863
[22] Filed: Jun. 26, 1984
[30] Foreign Application Priority Data Jul. 1, 1983 [JP] Japan .............................. 58-120878

[51] Int. Cl.⁴ .......................... B60T 8/26; B60T 17/18
[52] U.S. Cl. .................................... 303/6 C; 188/349; 303/24 C
[58] Field of Search ................... 303/6 C, 24 A, 24 F, 303/24 C, 24 R, 84 A, 84 R; 188/349

[56] References Cited

U.S. PATENT DOCUMENTS

| 3,304,128 | 2/1967 | Farr ..................................... 303/6 C |
| 4,053,186 | 10/1977 | Jakobi ................................. 303/6 C |
| 4,331,363 | 5/1982 | Berisch ............................... 303/6 C |
| 4,385,786 | 5/1983 | Kubota ............................... 303/6 C |

FOREIGN PATENT DOCUMENTS 2933878 3/1981 Fed. Rep. of Germany ...... 303/6 C
5448281 9/1977 Japan .

*Primary Examiner*—Douglas C. Butler
*Attorney, Agent, or Firm*—Sughrue, Mion, Zinn, Macpeak, and Seas

[57] ABSTRACT

A fluid pressure controlling valve for a dual-path brake system having a small of number of parts, compact construction, low cost and high reliability. The valve includes a pressure reducing valve for outputting an input fluid pressure of the first system and a follower valve for outputting a fluid pressure of the second system substantially equal to that of the first system and following the output fluid pressure of the first system. The follower valve is connected in series with the pressure reducing valve and has a first pressure receiving portion receiving an output fluid pressure of the first system in a valve opening direction and a second pressure receiving portion receiving an output fluid pressure of the second system acting in a valve closing direction and having an area equal to that of the first pressure receiving portion. The follower valve includes a fluid pressure responsive plunger having a third pressure receiving portion receiving the input fluid pressure of the second system in the valve opening direction and a fourth pressure receiving portion receiving the input fluid pressure of the first system, introduced through a fluid communication passage formed in the plunger, acting in the valve closing direction. The pressure receiving areas of the first through fourth pressure receiving portions are such that $a=b$, $c=d$ and $b \leq c$, where $a$, $b$, $c$ and $d$ respectively represent the pressure receiving areas of the first through fourth pressure receiving areas.

4 Claims, 1 Drawing Figure

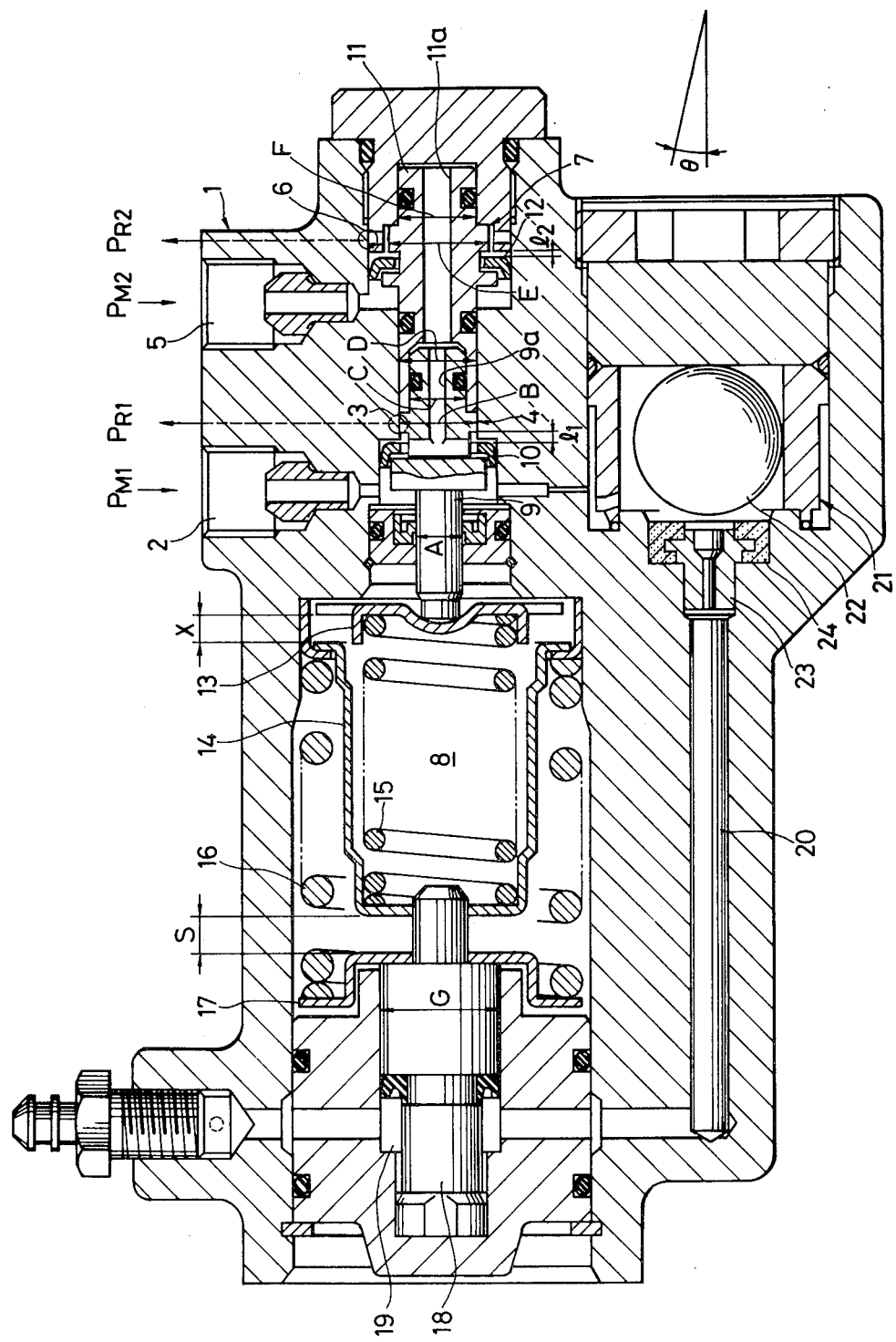

HYDRAULIC PRESSURE CONTROL VALVE FOR DUAL BRAKE CIRCUIT

BACKGROUND OF THE INVENTION

The present invention relates to a hydraulic pressure control device for use in dual brake circuits of a motor vehicle.

In a brake system of the so-called X-pattern fluid circuit type, dual hydraulic fluid paths are provided. Each of the fluid paths is connected to each one front wheel brake and one rear wheel brake positioned on opposite sides of the vehicle. According to the conventional X-pattern fluid circuit, generally, dual control valves are provided to independently control hydraulic pressure application to the right and left rear wheel brakes in order to obviate precedence lock of the rear wheels with respect to the front wheels. With this structure, a safety braking operation is obtained when the brake system of the vehicle fails. However, this arrangement is costly, and a pressure differential may occur between the two paths. Therefore, recently a single control valve has been provided to control the hydraulic pressures applied to the two paths so that they are approximately equal. According to one example of a dual fluid pressure control valve of this kind, a pressure reducing valve is disposed only in the first brake path and a pressure responsive valve is provided in the second brake path. The pressure responsive valve is arranged in series with the pressure reducing valve. The pressure responsive valve is adapted to output a hydraulic fluid pressure equal to the fluid pressure of the first brake path in response thereto.

According to the control valve thus constructed, if no pressure increase occurs upon a fault in the first brake path, the output fluid pressure in the second brake path should preferably be made higher than that in its normal operation. However, disadvantageously, such an output pressure increase is prevented so that it is impossible to compensate for the shortage of the braking force.

Further, a control valve for which the above disadvantages are eliminated is disclosed in Japanese Laid-Open Utility Model Application No. 54-48281. This control valve is provided with a third piston (intermediate cylinder) at an outer peripheral surface of a follower piston. The third piston moves to the fault side upon the occurrence of fault in the first brake path in order to release a bypass passage connecting input and output fluid pressure chambers of the second brake path. The bypass passage is normally closed, but upon movement of the third piston, it is opened to increase the output fluid pressure.

This control valve, however, has the following drawbacks:

(1) Since the third piston is provided at the outer periphery of the follower piston, the control valve is bulky as a whole.

(2) Upon the occurrence of a fault in the first brake path provided with the pressure reducing valve, the third piston, which has a large diameter, is moved to the fault side. Therefore, the amount of compensation of the second brake path is increased. As a result, a shortage in the stroke length of a fluid pressure generating device such as the master cylinder occurs.

SUMMARY OF THE INVENTION

The present invention is made to eliminate the above disadvantages. Briefly, in accordance with the present invention, a dual fluid pressure control valve is provided comprising a first pressure receiving portion for receiving, in the valve opening direction, the output fluid pressure of a first brake path which incorporates a pressure reducing valve, and a second pressure receiving portion having an area equal to that of the first pressure receiving portion and which receives the output fluid pressure of a second brake path in the valve closing direction. The second fluid pressure receiving portion is provided at a follower valve side. Further, the follower valve includes a fluid pressure responsive plunger which provides a third fluid pressure receiving portion and which receives the input fluid pressure of the second brake path in the valve opening direction and a fourth fluid pressure receiving portion which receives the input fluid pressure of the first brake path in the valve closing direction. The input fluid is introduced to the fourth pressure receiving portion through an internal bore formed in the plunger.

With this structure, with the pressure receiving areas of the first to fourth pressure receiving portions being represented a, b, c and d, respectively, the area a is equal to the area b, the area c is equal to the area d, and the area b is smaller than or equal to the area c.

BRIEF DESCRIPTION OF THE DRAWING

The single drawing FIGURE depicts in a cross-sectional view a hydraulic pressure control valve of the present invention.

DESCRIPTION OF THE PREFERRED EMBODIMENTS

A preferred embodiment of a control valve constructed according to the present invention will be described with reference to the accompanying drawing.

As shown in the single drawing FIGURE, a pressure reducing valve 4 is provided inside the bore of a control valve body 1. The pressure reducing valve 4 is adapted to proportionally reduce the input fluid pressure of the first brake path and to output the proportionally reduced pressure to one of the rear wheel brakes. The input fluid pressure is introduced into the bore of the control valve body 1 through an input port 2 and is discharged through an output port 3. Further, a follower valve 7 disposed in the bore is connected in series with the pressure reducing valve 4. The follower valve 7 is employed to proportionally control the input fluid pressure of the second brake path in response to the output pressure of the first path so as to make the pressure equal to the output fluid pressure of the first brake path and to output the controlled pressure to the other rear wheel brake. The input fluid pressure of the second brake path is introduced through an input port 5 and is discharged through an output port 6.

The pressure reducing valve 4 includes a fluid-pressure responsive plunger 9, having a rear portion having a cross-sectional area A, fluid tightly sealed and confronting a chamber 8, the pressure in which is atmospheric. The pressure reducing valve 4 is also provided with a valve seat 10 adapted to selectively open and close a passage between the input and output fluid pressure chambers by the selective contact of a valve head (portion B) with the seat 10. The plunger 9 is formed with a passage 9a having one end opened to the input pressure chamber and the other end opened to the distal end of the plunger.

Further, the follower valve 7 includes a fluid-pressure responsive plunger 11 and a valve seat 12. The plunger 11 has an outer peripheral surface fluid tightly sealed at its front and rear portions (portions F and D, respectively). The valve seat 12 allows selective contact of a valve head (portion E) therewith. Further, the front portion (portion C) of the outer peripheral surface of the plunger 9 of the pressure reducing valve is slidingly and fluid tightly inserted into a rear portion of an inner peripheral surface of the plunger 11. The plunger 11 of the follower valve 7 is formed with an internal passage 11a in fluid communication with the passage 9a of the plunger 9. The internal passage 11a is used to introduce the input fluid pressure of the first brake path to the tip end of the plunger 11. The introduced fluid pressure is applied to a fourth pressure receiving portion described below.

The plunger 11 of the follower valve has a first pressure receiving portion having a cross-sectional area D-C on which is received the output pressure from the first brake path in the valve opening direction, a second pressure receiving portion having a cross-sectional area E−F on which is received the output pressure from the second brake path in the valve opening direction, a third pressure receiving portion at an intermediate portion of the plunger 11 having a cross-sectional area E−D on which is received the input pressure from the second brake path in the valve opening direction, and a fourth pressure receiving portion having a cross-sectional area F−C on which is received the input pressure from the first brake path in the valve closing direction. With the cross-sectional areas of the first to fourth pressure receiving portions represented by a, b, c and d, respectively, in accordance with the invention, the area a is equal to the area b, the area c is equal to the area d, and the area b is smaller than or equal to the area c. Furthermore, the stroke $l_1$ of the plunger 9 is larger than or equal to the stroke $l_2$ of the plunger 11. In order to obtain the above relations a=b and c=d, the cross-sectional areas C, D, E and F of the various portions of the plunger should be $D-C=E-F$, that is, $E-D=F-C$. The reasons for this will be described below.

There is provided within the atmospheric pressure chamber 8 of the valve body 1 a brake point fluid pressure controlling spring 15 located between a spring holder 13 and a spring cage 14, movable in the axial direction through a stroke length X, for biasing the two plungers 9 and 11 in the valve opening direction. Further, there is provided at the rear portion of the cage 14 a piston 18, used for adjusting the load of the spring 15, which is actuated by the force of the spring 16 through a spring retainer 17. Also, an inertial valve 21 is provided for confining the pressurized fluid in a chamber 19 by closing a path 20 connecting the chamber 19 to the input fluid pressure chamber of the first brake path. The brake point fluid pressure adjusting mechanism composed of the inertial valve 21 and the piston 18 is known per se.

If the control valve is mounted at an angle $\theta$ with respect to the horizontal axis, upon having reached a predetermined vehicle deceleration, a ball 22 of the inertial valve 21 contacts a valve base 24 having an orifice 23 blocking the path 20. The fluid pressure present at that time within the piston receiving chamber 19 determines the stop position of the piston 18. Namely, the piston 18, moving in response to the input pressure increase, is stopped at the position at which the driving force produced by the pressure acting on the area G of the seal portion is balanced by the total forces of the springs 15 and 16. Therefore, a brake point fluid pressure proportional to the weight of the vehicle is obtained.

The orifice 23 is provided to avoid an undesirable increase of the fluid pressure beyond that necessary due to a delay in the start of deceleration upon urgent application of a braking force. The dummy stroke S of the piston 18 is provided in order to effectively obtain a delay in the change of fluid pressure confined by the orifice 23, even in the case of an empty vehicle with a low fluid pressure. Since these effects are well known to those skilled in the art, a detailed explanation is omitted.

The operation of the control valve described above will be explained hereinafter.

In normal operation in which the input fluid pressure $P_{M1}$ of the first brake path is equal to the input fluid pressure $P_{M2}$ of the second brake path, when the brake pedal is depressed, the piston 18 advances to compress the spring 15. The brake point fluid pressure proportional to the weight of the vehicle is as follows:

$$P_S = \frac{K_1}{K_1 + K_2} \cdot \frac{\tan\theta}{\beta} \cdot \frac{G}{A} \cdot W - \frac{K_1 \cdot F_2 - K_2 \cdot F_1}{A(K_1 + K_2)}, \tag{1}$$

where $F_1$ is the set load of the spring 15, $K_1$ is the spring constant of the spring 15, $F_2$ is the set load of the spring 16, $K_2$ is the spring constant of the spring 16, W is the weight of the vehicle, $\theta$ is the mounting angle of the control valve, and $\beta$ is the total braking effect coefficient for all four wheels.

At the initiation of the braking operation, namely, when the input fluid pressure is below the brake point fluid pressure, the plunger 9 of the pressure reducing valve 4 is in a nonactuated condition because the force $P_{M1}\cdot A$ is smaller than the force $P_S\cdot A$. The plunger 11 of the valve 7 is also stopped in a nonactuated position because the force in the valve opening direction is balanced by the force in the valve closing direction so that an equal fluid pressure acts on the first to fourth pressure receiving portions.

Next, when the input pressure reaches the brake point fluid pressure, as determined from equation (1), the plunger 9 moves in the valve closing direction because the force $P_{M1}\cdot A$ overcomes the spring force, as can be understood from the equation $P_S \cdot A = F_1 + K_1 \Delta X$, where $\Delta X$ is the amount of movement of the piston 18 after termination of the dummy stroke, and thus the pressure reducing operation is started. If the increment of the input fluid pressure after $P_{M1}$ becomes equal to $P_S$ is $\Delta P_{M1}$ and the increment of the output fluid pressure is $\Delta P_{R1}$, the balance equation of the increment of pressure acting on the plunger 9 is:

$$\Delta P_{M1}(B-A) = \Delta P_{R1}(B-C) + \Delta P_{M1}\cdot C.$$

Therefore, a fluid pressure proportionally decreased in the ratio $R_1 = \Delta P_{R1}\Delta P_{M1} = 1 - (A/B-C) < 1$ is supplied to the rear wheel brake of the first path.

On the other hand, on the side of the second path, the output fluid pressure of the first system acting on the first pressure receiving portion (D−C) of the plunger 11 is reduced simultaneously with the initiation of the pressure reducing operation of the pressure reducing valve 4 so that the force in the valve closing direction becomes larger than the force in the valve opening direction. Therefore, the plunger 11 moves at approximately the same time as the plunger 9 in the valve closing direction. Hence, the path between the input and output fluid pressure chambers is disconnected because $l_2 \leq l_1$ at that time. Then, with the increment of the input fluid pressure of the second system represented by $\Delta P_{M2}$, and the increment of the output fluid pressure by $\Delta P_{R2}$, the balance equation of the increment of the pressure acting on the plunger 11 is:

$$\Delta P_{M2}(E-D)+\Delta P_{R1}(D-C)=\Delta P_{R2}(E-F)+\Delta P_{M1}(F-C).$$

Where, in normal operation, the input fluid pressures in both paths are equally increased so that $\Delta P_{M1}=\Delta P_{M2}=\Delta P_M$, the following equation (2) is established:

$$\Delta P_{R1}(D-C)-\Delta P_{R2}(E-F)=\Delta P_M\cdot[(D-C)-(E-F)]. \quad (2)$$

In equation (2), if:

$$D-C=E-F, \quad (3)$$

the right side of equation (2) becomes zero and the left side thereof may be rewritten as the following equation (4):

$$(\Delta P_{R1}-\Delta P_{R2})(D-C)=0. \quad (4)$$

Therefore, if the areas D, C, E and F are set so as to satisfy equation (3), the relation of $\Delta P_{R1}=\Delta P_{R2}$ can be maintained.

The operation upon the occurrence of a fault in the second path, for instance, will now be discussed.

In the case where the second system including the follower valve 7 faults, according to the brake system of the X-pattern type, only two brakes serve for the braking operation among the four brakes for the front and rear wheels. Accordingly, the braking effect coefficient $\beta$, derivable from the expression $P_G=\tan\theta/\beta$. W for the normal condition, where $P_G$ is the confined fluid pressure of the piston 19, is halved. Therefore, the confined fluid pressure $P_G'$ of the piston 19 at that time is:

$$P_G' = \frac{\tan\theta}{\frac{\beta}{2}} \cdot W = 2P_G.$$

Accordingly, the fluid pressure for a constant weight W becomes twice that of the normal condition. Further, if the confined fluid pressure is increased, the spring cage 14 pushed by the piston 18 contacts the holder 13 upon passing through the stroke length X, avoiding movement of the plunger 9 in the valve closing direction. Therefore, if the spring load is set such that the confined fluid pressure $P_{G2}$ is $P_G \geq P_{G2}$, the pressure reducing operation in the first path is not effected upon the fault of the second system, and the reduction of the braking force is compensated.

In the case of a fault on the side of the follower valve 7, the fluid pressure of the first path applied to the first and fourth pressure receiving portions becomes zero so that the plunger 11 in the nonactuated position receives a force $F_1+P_{M2}\cdot F$ in the valve opening direction and a force $P_{M2}\cdot D$ in the valve closing direction, with the area b of the second pressure receiving portion being such that $b \leq c$. The two pressure receiving areas are thus $E-F$ and $E-D$, where $D \leq F$. Therefore, upon a fault in the first path, the force in the valve opening direction overcomes the force of the set load in the valve closing direction due to the spring 15 so that the plunger 11 of the second system stays at the valve opening position, regardless of the increment of the input fluid pressure, and hence the relation $P_{M2}=P_{R2}$ is maintained.

As mentioned above, according to the present invention the lack of a braking force upon a fault of the pressure reducing valve side is compensated only by the pressure reducing valve and the follower valve so that it is not necessary to provide a third piston for compensation. Therefore, a pressure control valve with a small number of parts, compact construction, low cost and high reliability is provided by the invention. Further, the relation $P_{M2}=P_{R2}$ is maintained by stopping the follower valve upon a fault on the pressure reducing valve side, the consumption of the hydraulic fluid is small, and the stroke increment of the braking pedal is also small. Still further, since it is not necessary to provide a third piston, a compact and light control valve structure is realized.

I claim:

1. In a fluid pressure controlling valve for a dual path brake system including a pressure reducing valve for outputting an input fluid pressure of a first fluid system and a follower valve connected in series with said pressure reducing valve for outputting a fluid pressure of a second fluid system substantially equal to that of said first fluid system and following said output fluid pressure of said first fluid system, said follower valve having a first pressure receiving portion receiving the fluid pressure of said first fluid system in a valve opening direction and a second pressure receiving portion for receiving an output fluid pressure of said second fluid system in a valve closing direction and having an area equal to that of said first pressure receiving portion, the improvement wherein said follower valve comprises a fluid pressure responsive plunger having a central passage formed therethrough, said fluid pressure responsive plunger having an annular portion functioning as said first pressure receiving portion, and a valve head provided centrally of said plunger, an annular valve seat disposed around said fluid pressure responsive plunger and being adapted to provide selected fluid communication between an inlet of said second fluid system and an output of said second fluid system by selective contact with said valve head, a third pressure receiving portion being provided at a stepped portion defined between said first pressure receiving portion and said valve head, for applying the input pressure of said second system in the valve opening direction of said follower valve, said follower valve having an end portion constituting a fourth pressure receiving portion for receiving the input pressure of said first fluid system via said central passage, and said second pressure receiving portion being provided at a second stepped portion defined between said valve head and said fourth pressure receiving portion for applying the output pressure of said second fluid system in the valve closing direction of said follower valve, said pressure receiving areas of said first, second, third and fourth pressure receiving portions being such that $a=b$, $c=d$, and $b \leq c$, where a, b, c and d represent the pressure receiving areas of said first, second, third and fourth receiving portions, respectively.

2. The fluid pressure controlling valve of claim 1, wherein said pressure reducing valve comprises a plunger having a stroke length larger than a stroke length of said plunger of said follower valve.

3. The fluid pressure controlling valve of claim 2, further comprising a brake point fluid pressure controlling spring for biasing said plunger of said follower valve and said plunger of said pressure reducing valve in a valve opening direction.

4. The fluid pressure controlling valve of claim 3, further comprising a piston for adjusting a load of said spring.

* * * * *